Dec. 23, 1924.

C. L. ROBBINS

AUTOMOBILE LOCK

Filed Sept. 7, 1923

1,520,600

INVENTOR.

Charles L. Robbins

BY

ATTORNEYS.

Patented Dec. 23, 1924.

1,520,600

UNITED STATES PATENT OFFICE.

CHARLES L. ROBBINS, OF ROCHESTER, NEW YORK.

AUTOMOBILE LOCK.

Application filed September 7, 1923. Serial No. 661,440.

*To all whom it may concern:*

Be it known that I, CHARLES L. ROBBINS, a citizen of the United States, residing at Rochester, in the county of Monroe and State of New York, have invented certain new and useful Improvements in Automobile Locks, of which the following is a specification.

The object of this invention is to provide a new and improved form of automobile lock more especially adapted to lock the steering mechanism to the front axle of the machine so as to prevent the steering of the car.

This and other objects of this invention will be fully illustrated in the drawing, described in the specification and pointed out in the claims at the end thereof.

In the accompanying drawing.

In the drawing like reference numerals indicate like parts.

Figure 1:
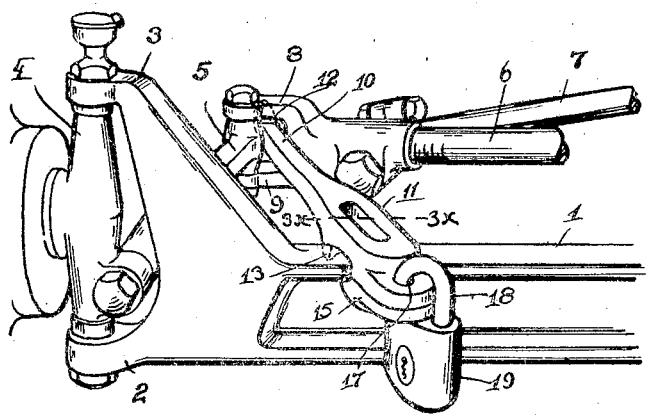
Figure 1 is a perspective view of a portion of the steering mechanism of a Ford car with the lock applied thereto.
Figure 2:
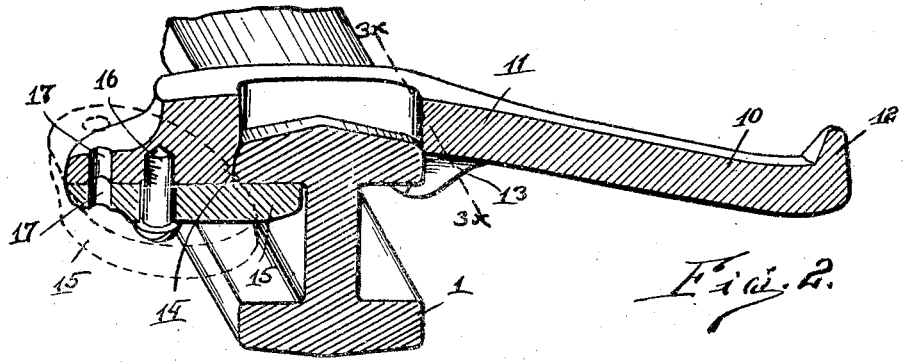
Figure 2 is a perspective view of the locking bracket in section engaged with the front axle shown in section.
Figure 3:
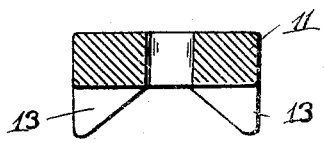
Figure 3 is a cross section of the locking bracket, the section being taken on the line 3×, 3×, Figures 1 and 2.

In the drawing reference numeral 1 indicates the front axle of a Ford automobile having a forked end represented by the numerals 2 and 3. In the forked ends is mounted to swing the spindle bearing 4 which carries the spindle on which the wheel rotates. Fastened to the spindle bearing is the lever arm 5 to which is connected a link 6 by which the two spindle bearings are connected together. 7 indicates the rod which is connected to the steering post. The end of the link 6 is forked as indicated at 8 and 9.

In this fork is adapted to engage the end 10 of the locking bracket 11. The end of the bracket is upset as indicated at 12 and is adapted to pass through the opening in the fork between the ends 8 and 9 when the bracket is tilted. After the upset end is engaged between the forks the rear end of the bracket is brought down into engagement with the axle 1. To make this engagement positive the bracket is provided with lugs 13 that engage on one side of the axle and is provided with a shoulder 14 that engages on the other side of the axle. In this way the bracket is positively held against movement transversely to the axle. For the purpose of locking the bracket to the axle a button 15 is provided pivoted to the bracket on the stud 16. Before the bracket is applied to the axle the button is turned to the dotted line position so that the bracket can be engaged with the axle. Thereafter the bracket is turned to the full line position in which it engages on one of the flanges of the axle and locks the bracket thereto. Both the bracket 10 and the button 15 are provided with holes 17, 17 and when the button is in the full line position these holes register with each other so that the hasp 18 of a padlock 19 may be passed through the two of them. In this way the button is locked in place and this in turn prevents the removal of the bracket from the axle. While the bracket remains in this position the upset end 12 of the bracket cannot be disengaged from between the points 8 and 9 of the fork and therefore holds the steering mechanism against movement, and prevents the theft of the car.

I claim.

1. In an automobile lock adapted for use on the link connection of the steering gear of an automobile, the combination of a locking bracket, a shoulder formed on the under side of said locking bracket near one end thereof, a lug formed on the under side of said locking bracket opposite to said shoulder, the front axle of the automobile being adapted to engage between said shoulder and said lug to hold said locking bracket against movement transverse to the axle of the automobile, a button pivoted on the under side of said locking bracket, said button being adapted to engage the under side of a flange of the front axle of the automobile and lock said locking bracket to the front axle.

2. In an automobile lock adapted for use on the link connection of the steering gear of an automobile, the combination of a locking bracket, a shoulder formed on the under side of said locking bracket near one end thereof, a lug formed on the under side of said locking bracket opposite to said shoulder, the front axle of the automobile being adapted to engage between said shoulder and said lug to hold said locking bracket against movement transverse to the axle of the automobile, a button pivoted on the under side of said locking bracket, said button being adapted to engage the under side of a flange of the front axle of the automobile and lock said locking bracket to the front axle, and means for locking said button against rotation on the under side of said locking bracket.

In testimony whereof I affix my signature.

CHARLES L. ROBBINS.